(12) United States Patent
Salsi et al.

(10) Patent No.: US 11,942,999 B2
(45) Date of Patent: Mar. 26, 2024

(54) SUBMARINE CABLE INTERFACE FOR CONNECTION TO TERRESTRIAL TERMINALS

(71) Applicant: Google LLC, Mountain View, CA (US)

(72) Inventors: Massimiliano Salsi, Sunnyvale, CA (US); Shuang Yin, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 17/992,208

(22) Filed: Nov. 22, 2022

(65) Prior Publication Data

US 2023/0090500 A1 Mar. 23, 2023

Related U.S. Application Data

(62) Division of application No. 17/220,526, filed on Apr. 1, 2021, now Pat. No. 11,539,448.

(51) Int. Cl.
| | |
|---|---|
| *H02G 15/14* | (2006.01) |
| *G02B 6/42* | (2006.01) |
| *G02B 6/44* | (2006.01) |
| *H04B 10/035* | (2013.01) |
| *H04B 10/80* | (2013.01) |

(52) U.S. Cl.
CPC .......... *H04B 10/80* (2013.01); *G02B 6/4278* (2013.01); *G02B 6/4427* (2013.01); *H02G 15/14* (2013.01); *H04B 10/035* (2013.01)

(58) Field of Classification Search
CPC .... H04B 10/80; H04B 10/035; G02B 6/4278; G02B 6/4427; H02G 15/14
USPC .......................................................... 398/104
See application file for complete search history.

(56) References Cited

U.S. PATENT DOCUMENTS

| 2015/0181746 A1* | 6/2015 | Mullen | H05K 7/1487 361/752 |
|---|---|---|---|
| 2019/0097727 A1* | 3/2019 | Mikami | H04B 10/077 |
| 2020/0387409 A1 | 12/2020 | Nguyen et al. | |

FOREIGN PATENT DOCUMENTS

| EP | 2088697 A1 * | 8/2009 | ............. H04B 10/08 |
|---|---|---|---|
| EP | 3101827 A1 | 12/2016 | |
| JP | 2005195741 A * | 7/2005 | ............... G02B 6/44 |
| JP | 2005195741 A | 7/2005 | |

\* cited by examiner

*Primary Examiner* — Mohammad R Sedighian
*Assistant Examiner* — M R Sedighian
(74) *Attorney, Agent, or Firm* — Lerner David LLP

(57) ABSTRACT

In an optical network having a terrestrial terminal and an open cable interface (OCI) connecting a submarine cable to a terrestrial cable, the OCI may include a filter positioned on an optical path between the terrestrial cable and the submarine cable and configured to pass first communication signals of a first frequency band, and filter out secondary signals of a second frequency band that does not overlap with the first frequency band. The secondary signals may be looped back to the terrestrial terminal. The terrestrial terminal may detect the looped back secondary signals, and in response, determine the presence of the OCI and that the supervisory signals were rerouted by the OCI.

10 Claims, 5 Drawing Sheets

SUBMARINE CABLE INTERFACE FOR CONNECTION TO TERRESTRIAL TERMINALS

CROSS-REFERENCE TO RELATED APPLICATIONS

This application is a divisional of U.S. patent application Ser. No. 17/220,526, filed on Apr. 1, 2021, the disclosure of which is incorporated herein by reference.

BACKGROUND

Communication networks include both terrestrial optical cables to carry optical communication signals over land, and submarine optical cables to carry the optical communication signals across large bodies of water between land masses. In a typical scenario, the signals from a terrestrial network are not compatible with those from a submarine network. The signals of the respective networks may differ in terms of frequency ranges, modulation formats of the data channels, and both type and quality of supervisory channels for system telemetry, control, and operations.

In order to interface the terrestrial cables with the submarine cables to create an interconnected optical network, conventional optical network systems include specialized equipment. This specialized equipment for facilitating this interface is commonly termed submarine line terminal equipment (SLTE). SLTE generate the signals that are transmitted across submarine cables. For instance, SLTE include the components for multiplexing optical wavelengths, adjusting power levels of optical signals, filtering parts of the optical spectrum, loading the submarine cables with noise in some regions of the spectrum, and so on.

However, the use of specialized and dedicated SLTE to interface the submarine network with the terrestrial network is costly and burdensome. Having to produce specialized terrestrial equipment, as compared to only producing standard terrestrial equipment, adds significant cost to the overall system. Furthermore, installation of standard terrestrial equipment is cheap and straightforward, but installation of SLTE is expensive because it requires a skilled technician to manually calibrate power levels of the equipment so that it operates correctly, such as by inserting a patch cord or creating an offset splice in order to add a desired amount of residual attenuation. Additionally, the differences between standard terrestrial equipment and SLTE necessitate assigning different stock keeping units (SKUs) to each type of terminal. This, in turn, requires tracking and managing an extra SKU in order to maintain the network, which adds undue time and cost to the maintenance process.

BRIEF SUMMARY

The present disclosure avoids the need for specialized SLTE at the interface with the submarine cables. This is accomplished by providing an optical cable interface (OCI) between the submarine cable and a standard terrestrial cable with a filter to filter out signals with frequencies outside of the allowed frequency range for submarine systems. The OCI may further be configured to loop the filtered out signals back towards the terrestrial cable network, which may be used to indicate the presence of an interface between a terrestrial optical cable and a submarine optical cable to control circuitry in the terrestrial optical network.

One aspect of the present disclosure is directed to an open cable interface (OCI) configured to connect a submarine cable to a terrestrial cable of an optical network, the open cable interface comprising: a first optical path configured to provide first communication signals from the optical network to the submarine cable; and a second optical path configured to provide second communication signals from the submarine cable to the optical network, wherein the first and second communication signals are within a first frequency band; and a first filter positioned on the first optical path and configured to: pass the first communication signals; and filter out secondary signals from the terrestrial cable, wherein the secondary signals are within a second frequency band that does not overlap with the first frequency band.

In some examples, the second frequency band may include at least one of 1510 nm or 1610 nm.

In some examples, the first filter may be a wavelength division multiplexing (WDM) filter.

In some examples, the secondary signals may include an optical supervisory channel signal.

In some examples, the secondary signals may include an optical time-domain reflectometry signal.

In some examples, the OCI may include a second filter positioned on the second optical path and configured to pass the second communication signals from the submarine cable to the terrestrial cable, and the first and second filters may be configured to loop the secondary signals received from the terrestrial cable back to the terrestrial cable.

In some examples, the OCI may include a first variable optical attenuator (VOA) positioned on the first optical path between the first filter and the submarine cable and configured to adjust a power level of the first communication signals without affecting a power level of the secondary signals.

In some examples, the OCI may include a second VOA positioned on the second optical path between the second filter and the submarine cable.

In some examples, the OCI may be configured to connect to a terrestrial transmission equipment having a same stock keeping unit (SKU) as other equipment included in the optical network that do not interface submarine cables.

In some examples, the terrestrial cable may have a same SKU as other terrestrial cables included in the optical network.

Another aspect of the disclosure is directed to a system comprising: one or more processors; and memory in communication with the one or more processors and containing instructions configured to cause the one or more processors to: transmit a supervisory signal from a terminal of a terrestrial optical cable of a terrestrial network; detect the supervisory signal being reflected back to the terminal; in response to detection of the supervisory signal being reflected back to the terminal, determining that the supervisory signal was rerouted by an optical cable interface to a submarine cable.

In some examples, the instructions may be further configured to cause the one or more processors to, in response to determining that the supervisory signal was rerouted by an optical cable interface to a submarine cable, initiate a power reduction program configured to maintain power levels of transmissions to the submarine cable at or below a predetermined power level.

In some examples, the instructions may be further configured to cause the one or more processors to: monitor a power level of a communication signal passed through a WDM filter of the OCI; and in response to determining that the supervisory signal was rerouted by an optical cable interface to a submarine cable, adjust a power level of the communication signal to at or below the predetermined submarine cable power level.

In some examples, the instructions may be further configured to cause the one or more processors to, in response to determining that the supervisory signal was rerouted by an optical cable interface to a submarine cable: set a travel distance of the supervisory signal from the terminal to the optical cable interface and back to the first terminal as twice a distance between the terminal and the optical cable interface; and evaluate travel time of supervisory signals transmitted from the terminal to the optical cable interface based on the set travel distance.

In some examples, the instructions may be further configured to cause the one or more processors to, in response to determining that the supervisory signal was rerouted by an optical cable interface to a submarine cable: determine a loss in supervisory signals transmitted from the terminal to the OCI and back to first terminal; and estimate an actual loss of supervisory signals transmitted from the terminal to the OCI to be half of the determined loss.

Yet another aspect of the disclosure is directed to an optical network comprising: a plurality of terrestrial optical cable terminals, including a first terrestrial optical cable terminal interfacing an optical cable interface to a submarine cable and a second terrestrial optical cable terminal that does not interface an optical cable interface to a submarine optical cable; and a system as described in any of the embodiments herein.

In some examples, the first terrestrial optical cable terminal and the second terrestrial optical cable terminal may have a common SKU.

Yet a further aspect of the disclosure is directed to a method comprising: transmitting, by one or more processors, a supervisory signal from a terminal of a terrestrial optical cable of a terrestrial network; detecting, by the one or more processors, the supervisory signal being reflected back to the terminal; and in response to detection of the supervisory signal being reflected back to the terminal, determining, by the one or more processors, that the supervisory signal was rerouted by an optical cable interface to a submarine cable.

In some examples, the method may be performed during initialization of a supervisory program for monitoring signals transmitted over the terrestrial network.

In some examples, the method may further include, in response to determining that the supervisory signal was rerouted by an optical cable interface to a submarine cable, activating a submarine cable use case. The submarine cable use case may include one or more of the following: reducing a power level of communication signals transmitted from the terminal towards the OCI to a predetermined submarine cable power level or below; evaluating a travel time of a supervisory signal transmitted from the terminal towards the OCI as a round trip time; or evaluating a loss of the supervisory signal transmitted from the terminal towards the OCI to be half of a measured loss at the terminal.

DETAILED DESCRIPTION

Overview

Figure 1:
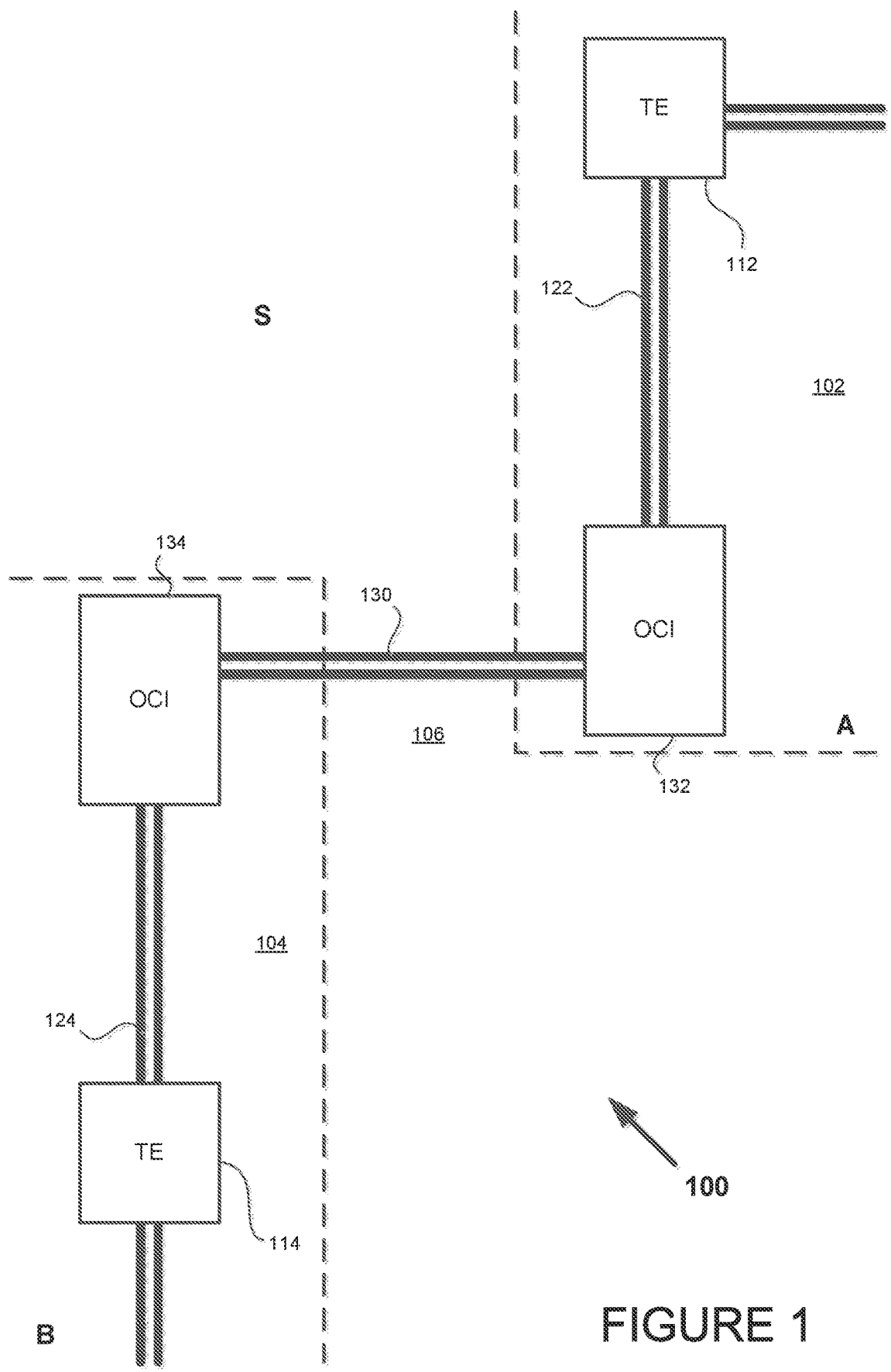
FIG. 1 is a schematic diagram of an optical network according to aspects of the disclosure.

The present disclosure relates generally to devices and methods for interfacing a terrestrial optical network and a submarine optical network without specialized SLTE. Specifically, an OCI including a filter is positioned along a first optical communication path of the OCI from a terrestrial cable to a submarine cable. The filter is capable of passing communication signals within a first frequency band that is within the allowed frequency range for the submarine cable, while filtering out other signals, such as supervisory signals, that are outside of the allowed frequency range for the submarine cable.

In some examples, the OCI may include a second filter positioned along a second optical communication path of the OCI from the submarine cable to the terrestrial cable. The first and second filter may be capable of looping the filtered-out other signals back towards the terrestrial cable network. At the terrestrial cable network, the looped back signals may be detected by standard terminal equipment, and their detection may be interpreted as indicating the presence of an interface between a terrestrial cable and a submarine cable. Because the presence of the interface is detectable using the looped back signals, standard terminal equipment within the terrestrial system can control a power level of the communication signals within the first frequency band based on the detection. Thus, both frequency control and power control using standard terrestrial terminal equipment are made possible by the inclusion of the first and second filters and a loopback path within the OCI.

In some further examples, the OCI may also include at least one variable optical attenuator (VOA) positioned along the first optical communication path between the first filter and the submarine cable. The VOA may be responsible for adjusting the power level of the communication signals passed by the first filter before they are received at the submarine cable. Using a VOA positioned on the "submarine side" of the first filter, as opposed to attenuating elements positioned within the terrestrial network or on the "terrestrial side" of the first filter within the OCI, is beneficial for avoiding attenuation of the other signals that are looped back to the terrestrial network, especially considering that positioning attenuating elements on the "terrestrial side" of the filters would doubly attenuate the signals (once along each path) and would potentially make detection of the looped back signals more difficult.

Inclusion of the OCI of the present disclosure at an interface between a terrestrial optical network and a submarine optical network avoids the need for specialized SLTE on the terrestrial side of the interface. This achieves a reduction in cost due to the relative low cost of standard terrestrial optical cables, as compared to SLTE. Furthermore, no hardware changes are needed to the terrestrial equipment. A software update can be provided to the standard terrestrial terminal equipment in order to detect locations of the terrestrial network that interface with submarine cables based on supervisory signals that loop back towards the standard terrestrial terminals. Additionally, when all terrestrial/submarine interfaces in the optical network are outfitted with the OCI of the present disclosure, a single SKU can be used for all terminal equipment of the entire network.

Example Systems

FIG. 1 is a schematic diagram of an optical network 100 including a first terrestrial optical network 102 and a second terrestrial optical network 104 connected to one another by a submarine optical network 106. For instance, each of the terrestrial optical networks 102, 104 may be situated at landmasses A and B that are separated by a body of water such as sea S, and the submarine network may be situated primarily in the sea S. The respective terrestrial networks of the landmasses A, B may be communicatively connected to one another via one or more submarine cables across the sea S.

Each of the terrestrial optical networks 102, 104 is shown to include at least one respective terminal including terminal equipment (TE) 112, 114 for receiving and transmitting communication signals through the optical networks, and for monitoring operation of the optical networks. The terminal equipment 112 of the first terrestrial optical network 102 is connected to a first optical cable 122, and the terminal equipment 114 of the second terrestrial optical network 104 is connected to a second optical cable 124. The first and second optical cables are connected to each other by the submarine optical network 106. Additional terminals and optical cables (not shown) may be included in each optical network.

The submarine optical network 106 may include one or more submarine optical cables 130 that are connected at opposite ends to the first and second terrestrial optical networks 102, 104, respectively. In the example of FIG. 1, a first end of the one or more submarine optical cables 130 is connected to the first optical cable 122 through a first open cable interface (OCI) 132, and an opposite second end of the one or more submarine optical cables 130 is connected to the second optical cable 124 through a second OCI 134. Furthermore, each of terminal equipment 112 and 114 may be standard terrestrial terminal equipment, as compared to SLTE. As such, both ends of the one or more submarine optical cables 130 may be connected to standard terrestrial terminal equipment through respective optical cables.

Figure 2A:
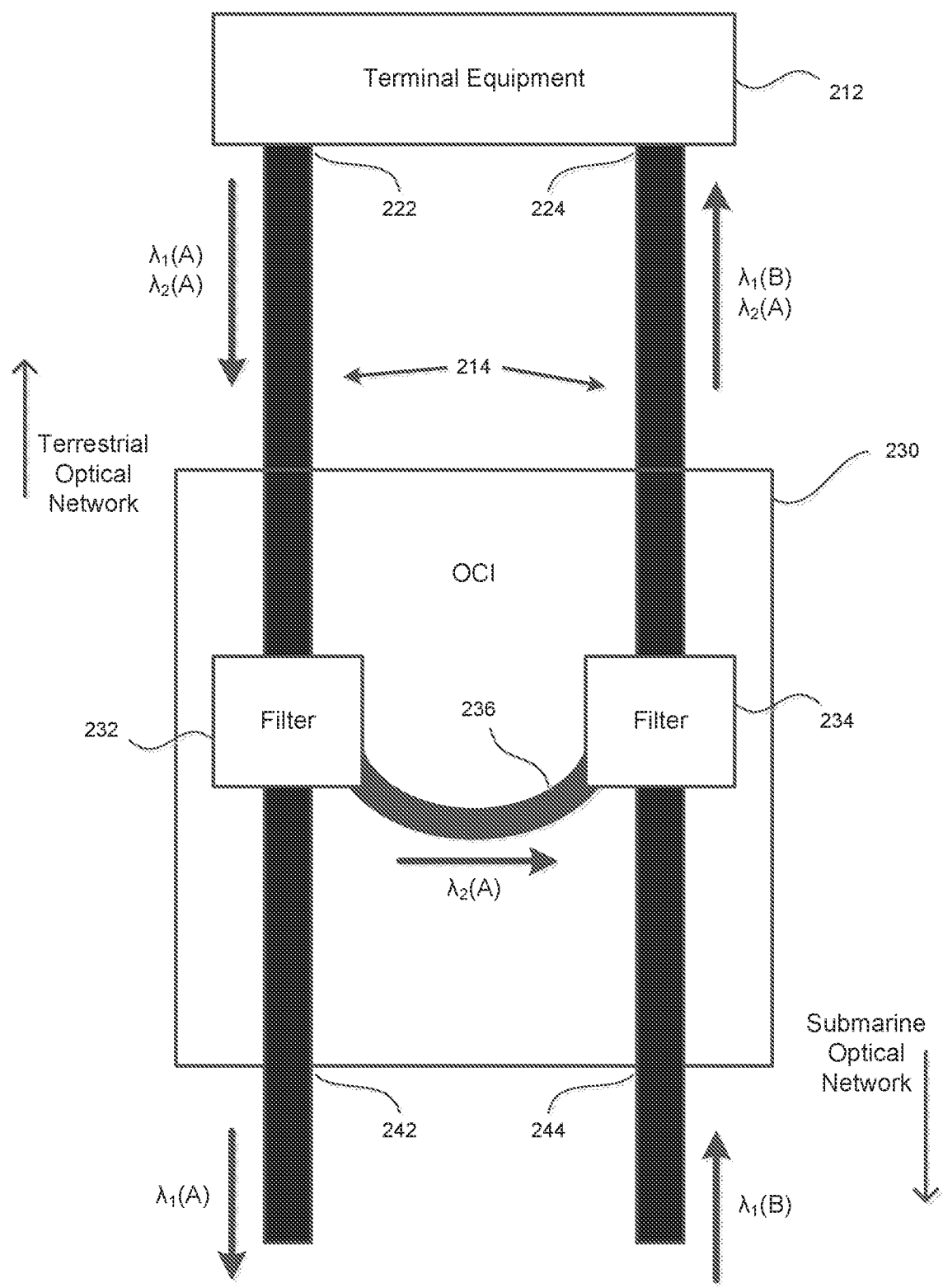
FIGS. 2A and 2B are schematic diagrams of example open cable interfaces (OCI) according to aspects of the disclosure.

Each of the OCIs 132, 134 may be adapted in order to support compatibility between the cables of the submarine optical network 106 and the terrestrial optical networks 102, 104. FIG. 2A is a schematic diagram of an example OCI 230 for interfacing a submarine optical network with a terrestrial optical network using standard terrestrial terminal equipment 212. In the example FIG. 2A, an optical cable 214 is shown as including two optical paths: a first optical path originating at point 222 from which the terminal equipment 212 is configured to transmit optical signals; and a second optical path ending at point 224 at which the terminal equipment 212 is configured to receive optical signals. Together, the first and second optical paths of the optical cable 214 facilitate bidirectional communication between the terminal equipment 212 and the OCI 230.

The optical signals transmitted and received by the terminal equipment 212 may include each of communication signals and secondary signals. The communication signals may include communication data, such as messages communicated between end terminals of the optical network. The communication signals may have a first wavelength $\lambda_1$ that is within a first frequency band supported by the submarine optical network. Thus, the communication signals may be transmitted between landmasses A, B, through the submarine optical network. The secondary signals may include telemetry signals for monitoring operation and performance of a terrestrial optical network, such as optical supervisory channel (OSC) signals, optical time-domain reflectivity (OTDR) signals, and the like. The secondary signals may not be supported by the submarine optical network. Therefore, in order to prevent the secondary signals from being transmitted to or relayed through the submarine optical network, the secondary signals may have a second wavelength $\lambda_2$ that is within a second frequency band that does not overlap with the first frequency band. In one example arrangement, the first frequency band may include wavelengths less than 1510 nm, and the second frequency band may include wavelengths between 1510-1610 nm. In a different example arrangement, the second frequency band may include a wavelength of 1625, such as to support terrestrial OTDR signals.

The use of non-overlapping frequency bands for communication signals and secondary signals allows for the signals to be separated from one another using one or more filtering techniques, including but not limited to high-pass filtering, low-pass filtering, bandpass filtering, notch filtering, and so on. In the example of FIG. 2A, a filter 232 is positioned at the OCI 230 on the first optical path. Communication signals from a first terrestrial optical network $\lambda_1(A)$ and secondary signals from the first terrestrial optical network $\lambda_2(A)$ are transmitted from point 222 towards the OCI 230. At the OCI, the filter 232 may be a wavelength division multiplexing (WDM) filter, and may be configured to pass the communication signals $\lambda_1(A)$ and to filter out the secondary signals $\lambda_2(A)$. Thus, only the communication signals $\lambda_1(A)$ that are supported by the submarine optical network are passed to point 242 and transmitted through the submarine optical network, while the secondary signals $\lambda_2(A)$ that are not supported are prevented from reaching the submarine optical network.

In another example configuration, also shown in FIG. 2A, a second filter 234 is positioned at the OCI 230 on the second optical path, and an optical loopback path 236 is provided between the first filter 232 and the second filter 234. The first filter 232 may be configured to send the filtered-out secondary signals $\lambda_2(A)$ to the second filter 234 via the optical loopback path 236, and the second filter may be configured to reflect the secondary signals $\lambda_2(A)$ received from the first filter 232 back to the terminal equipment 212 along the second optical path. The reflected-back or looped-back secondary signals $\lambda_2(A)$ may be transmitted from the OCI 230 along the second optical path.

FIG. 2A also shows communication signals from a second terrestrial network $\lambda_1(B)$ being received by the OCI 230 at point 244 of the second optical path. These communication signals may have the same wavelength as the communication signals from the first terrestrial optical network $\lambda_1(A)$, or may fall within the same first frequency band. Furthermore, the second filter 234 may be configured in the same or similar manner as the first filter 232, and thus may be configured to pass the communication signals from the second terrestrial network $\lambda_1(B)$, resulting in the communication signals along with the looped back secondary signals $\lambda_2(A)$.

In the example of FIG. 2A, power level control for communication signals from the first terrestrial optical network $\lambda_1(A)$ may be performed on the terrestrial side of the OCI 230, such as at the terminal equipment 212. Adjusting the signals' power level may involve adding a predetermined attenuation to the signals, and may be performed in order for the signals to meet power requirements of the submarine optical network. However, by performing the power level control on the terrestrial side of the OCI 230, a power level of the secondary signals $\lambda_2(A)$ is also affected. Since the secondary signals $\lambda_2(A)$ are not directed through the submarine optical network, the power level of the secondary signals $\lambda_2(A)$ does not need to be adjusted in the same manner.

Figure 2B:
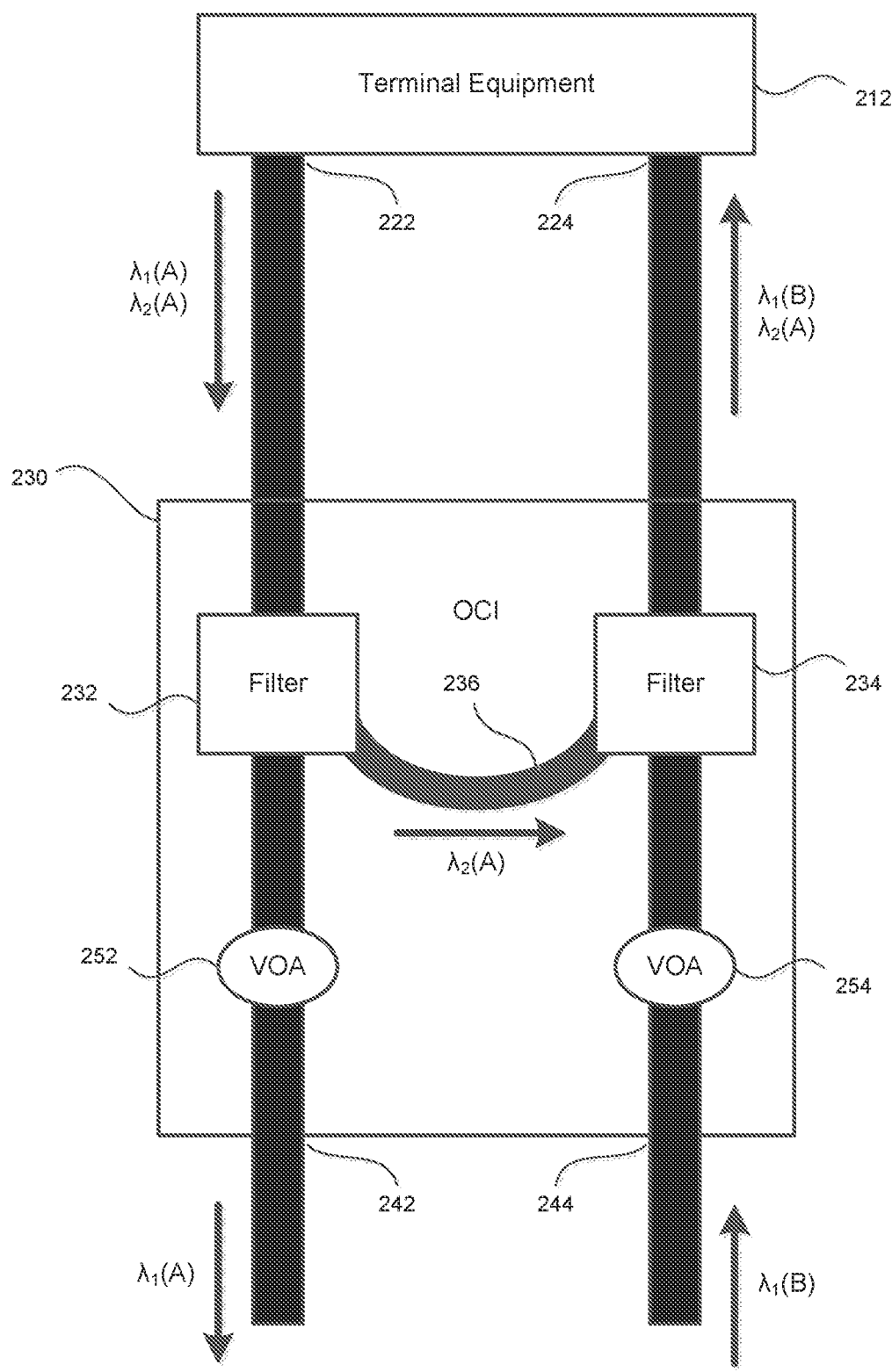

FIG. 2B is a schematic diagram of another example OCI for selective power adjustment of communication signals without affecting secondary signals. Like the example OCI of FIG. 2A, the OCI of FIG. 2B interfaces a submarine optical network with a terrestrial optical network using standard terrestrial terminal equipment. The features of FIG. 2B are the same as for FIG. 2A, except for the addition of one or more variable optical attenuators (VOA) along the first and second optical paths. Along the first optical path, a first VOA 252 is positioned between the first filter 232 and the submarine optical network. The first VOA 252 may be configured to adjust a power level of the communication signals from the first terrestrial optical network $\lambda_1(A)$, such as by lowering the power level in order to meet power requirements of the submarine optical network. By positioning the first VOA 252 on the first optical path after the filter 232, the first VOA 252 is capable of controlling the power level of the communication signals $\lambda_1(A)$ without affecting the power level of the secondary signals $\lambda_2(A)$.

In some examples, the attenuation introduced by the first VOA 252 may be a fixed value. For instance, the value may be set during installation of the OCI 230, either manually or automatically. A manual approach to setting the attenuation value is for the value to be assigned by a remote operator through a network management software interface. An automatic approach to setting the attenuation value is for the value to be assigned according to an automated script or software controller. In either approach, the VOA 252 could include a sensor to monitor power at the VOA 252 by routing a small predetermined fraction of the transmitted signals to a photodetector. Measurements from the photodetector may then be provided to the remote operator or automated program, and in turn can be used to determine and set the fixed attenuation of the VOA 252.

In other examples, the attenuation introduced by the first VOA 252 may be a variable amount subject to continuous adjustments based on feedback from the VOA 252. For instance, a local control loop may be provided within the OCI. The local control loop may include a photodetector to sense an amount of power being output through the VOA 252, and a control mechanism such as a microcontroller to control the VOA 252 in a manner that reduces, and over time minimizes, a difference between a current power level of the VOA 252 and a preset target power level. In such an example, the preset target power level may be determined and programmed during the installation process.

In some examples, a second VOA 254 may also be included in the OCI 230. The second VOA 254 may be positioned along the second optical path, between the second filter 234 and the submarine optical network. The second VOA 254 may be configured to control the power level of the communication signals $\lambda_1(B)$. For example, the power level of the communication signals $\lambda_1(B)$ may be lowered by the second VOA 254 to within a preset level suitable for the terminal equipment 212. Such power adjustment may be necessary if the terminal equipment 212 is positioned close to the OCI 230, meaning that little to no attenuation occurs from the OCI 230 to the terminal equipment 212.

Both example arrangements of FIGS. 2A and 2B allow for passage of communication signals to the submarine optical network while blocking passage of the secondary signals. Both example arrangements also permit for control to power levels of the communication signals prior to their entry to the submarine optical network. Both example arrangements also permit for the looping back of supervisory signals, which has the added benefit of communicating the presence of the OCI to the adjacent terminal equipment included in the terrestrial optical network, such as TE 112 of the first optical network 102 in the example of FIG. 1. For instance, if a given terrestrial terminal were to transmit supervisory signals to an adjacent node within the optical network and the supervisory signals were received back at the same given terrestrial terminal, it could be inferred that the supervisory signals were looped back towards the given terrestrial terminal by a filter and optical loopback path of an OCI, thus indicating the presence of the OCI, and by extension the presence of a submarine optical network interfaced to the terrestrial optical network by the OCI. Communicating the presence of the OCI may be beneficial for enabling the adjacent terminal equipment to adjust one or more settings for accommodating the nearby interface to the submarine optical network without requiring the specialized and dedicated hardware of SLTE.

Figure 3:
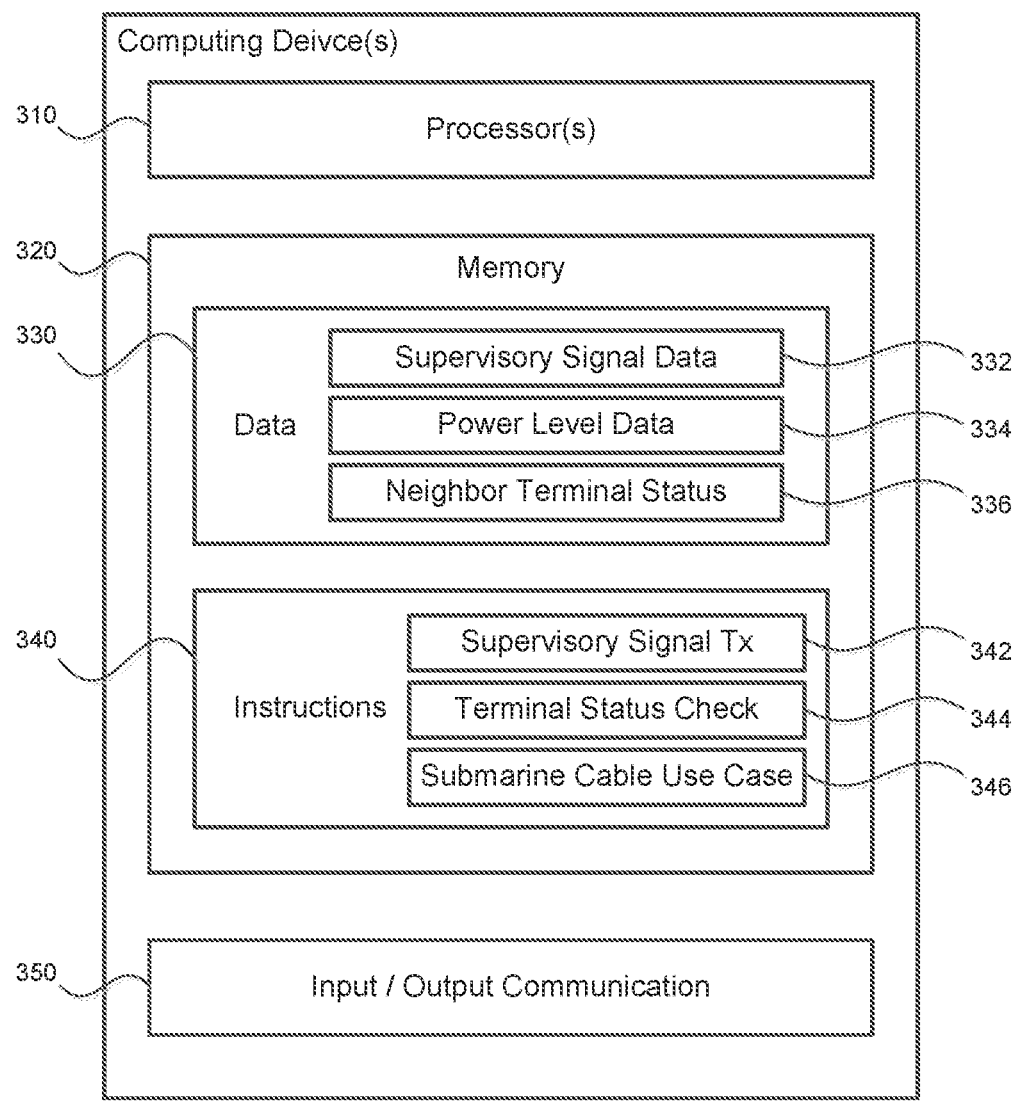
FIG. 3 is an example block diagram of terrestrial terminal equipment (TE) according to aspects of the disclosure.

FIG. 3 is an example block diagram of standard terrestrial terminal equipment (TE). The standard terrestrial TE includes one or more computing devices 300 programmed with data and instructions sufficient for transmitting supervisory signals and detecting when the supervisory signals are rerouted or looped back towards their origin. The one or more computing devices 300 may include a processor 310, memory 320, and one or more communication devices 350 for receiving inputs and transmitting outputs.

The processor 310 can be a well-known processor or other lesser-known type of processor. Alternatively, the processor can be a dedicated controller such as an ASIC.

The memory 320 can store information accessible by the processor 310 including data that can be retrieved, manipulated or stored by the processor, instructions that can be executed by the processor, or a combination thereof. Memory may be a type of non-transitory computer readable medium capable of storing information accessible by a processor such as a hard-drive, solid state drive, tape drive, optical storage, memory card, ROM, RAM, DVD, CD-ROM, write-capable, and read-only memories.

Although FIG. 3 functionally illustrates each of the processor 310 and memory 320 as being a respective single block, the processor and memory may actually include multiple processors, multiple memories, or any combination thereof, that may or may not be stored in a common location or within the same physical housing. For example, some or all of the data and instructions can be stored on a removable CD-ROM and others within a read-only computer chip. For further example, some or all of the data and instructions can be stored in a location physically remote from, yet still accessible by, the processor. Similarly, the processor can actually include a collection of processors, which may or may not operate in parallel.

The one or more communication devices may facilitate communication between the terminal and other remote terminals and components of the optical network that are in communication with the terminal. The remote terminals and components may include terrestrial nodes of the terrestrial optical network, as well as OCIs interfacing the terrestrial optical network to one or more submarine optical networks. The communication devices may be capable of transmitting data to and from other computers such as modems (e.g., dial-up, cable or fiber optic) and wireless interfaces. For example, each node may receive communications via the network connection 130, such as through the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and RPC, HTTP, and various combinations of the foregoing.

The memory 320 may include instructions 340, and may further include data 330 that can be retrieved, stored or modified by the processors 310 in accordance with the instructions 340. For instance, although the computing devices 300 disclosed herein are not limited by a particular data structure, the data 330 can be stored in computer registers, in a data store as a structure having a plurality of different fields and records, or documents, or buffers. The data 330 can also be formatted in a computer-readable format such as, but not limited to, binary values, ASCII or Unicode. Moreover, the data 330 can include information sufficient to identify relevant information, such as numbers, descriptive text, proprietary codes, pointers, references to data stored in other memories, including other network locations, or information that is used by a function to calculate relevant data.

The instructions 340 can be a set of instructions executed directly, such as machine code, or indirectly, such as scripts, by the processor 310. In this regard, the terms "instructions," "steps" and "programs" can be used interchangeably herein. The instructions 340 can be stored in object code format for direct processing by the processor 310, or other types of computer language including scripts or collections of independent source code modules that are interpreted on demand or compiled in advance.

In the example of FIG. 3, the data 330 stored in the memory 320 may include supervisory signal data 332 indicating information about the communication signals and the remote conditions of one or more optical terminals included in the network. The supervisory signal data 332 can be used to remotely determine whether nodes and terminals of the network are operating properly. For instance, the supervisory signal data 332 may be used to detect losses, delays, or disruptions within the network based on supervisory data, such as feedback from remote nodes, round trip times, and the like. Examples of supervisory signals include but are not limited to OSC signals and OTDR signals. The supervisory signal data 332 can further be used to facilitate remote management of the network based on detected issues within the network, such as by resending or rerouting optical signals.

The data 330 may further include power level data 334 indicating prescribed power levels for optical signals transmitted to various terminals and nodes included in the network. For instance, the power level data may indicate a first power level at which communication signals to adjacent terrestrial terminals should be transmitted, and a second power level lower than the first power level at which communication signals to adjacent OCIs should be transmitted.

The data 330 may further include a neighbor terminal status 336 indicating respective statuses for adjacent nodes of the network. For instance, with regard to adjacent terrestrial terminals, the neighbor terminal status of those nodes may indicate that they are terrestrial terminals. Alternatively, with regard to an OCI connected to the terminal equipment by an optical cable, the neighbor terminal status for such a node may indicate the presence of an OCI interfacing a neighboring submarine optical network.

The instructions 340 stored in the memory may include a supervisory signal transmission routine 342 for transmitting supervisory signals and collecting supervisory signal data from remote nodes of the network.

The instructions 340 may further include a terminal status check routine 344 for checking the status of a given terminal, such as an adjacent terminal within the network. For instance, the terminal status check routine 344 may involve transmitting an optical signal having a wavelength within a given range that corresponding to a waveband filtered by a filter of an OCI included in the network. Then, if the transmitted optical signal is received at the transmitting terminal, it may be determined that the signal was looped back towards the terminal by an OCI, thus indicating the presence of an interface with a neighboring submarine optical network.

The instructions 340 may further include a submarine cable use case routine 346 for configuring a use case of the terminal in response to detection of an interface with a neighboring submarine optical network. The submarine cable use case routine 346 may involve changing one or more configurations of the terminal including the one or more computing devices 300 in order for the terminal to accommodate communications with an OCI interfacing the submarine optical network to the terminal. The configurations may include, but are not limited to, power level configurations, supervisory signal evaluation configurations, or any combination thereof. Some example submarine cable use cases are provided herein in connection with FIG. 4.

Example Methods

Example routines 400 performed by the processor of one or more computing devices of terrestrial terminal equipment are described in greater detail in connection with the diagram of FIG. 4. The routines may include a terminal status check routine, a submarine cable use case routine, and so on. It should be understood that the routines described herein are merely examples, and in other examples, certain steps may be added, subtracted, replaced or reordered.

At block 410, a supervisory signal is transmitted from a first terminal of the terrestrial optical network. The supervisory signal may be transmitted through an optical cable to one or more adjacent nodes of the first terminal. The supervisory signal may be an OSC signal, an OTDR signal, or another signal through which the first terminal may be capable of monitoring performance of the optical network.

At block 420, the first terminal determines whether the supervisory signal is transmitted back to the first terminal. This may involve receiving signals at one or more input communication ports of the first terminal, processing the received signals, and identifying one or more of the received signals as being the same as a previously transmitted supervisory signal. In the absence of the supervisory signals being received at the first terminal, such as after passage of a predetermined duration of time, or after receiving an acknowledgment signal indicating that the transmitted supervisory signals were received at another node of the optical network, it may be determined that the supervisory signal was not transmitted back to the first terminal.

If it is determined that the supervisory signal was not transmitted back to the first terminal, then operations continue at block 430, at which the first terminal determines that the supervisory signal was transmitted to a second terminal, which may be another terminal of the terrestrial optical network connected to the first terminal. In this case, it may be determined that future optical signals transmitted to the same node may be configured as terrestrial optical signals. For instance, this may involve transmitting the optical signals at a predetermined power level or without adding attenuation to the optical signals before transmission.

Alternatively, if it is determined that the supervisory signal was transmitted back to the first terminal, then operations continue at block 440, at which the first terminal determines that the supervisory signal was rerouted or looped back to the first terminal by an OCI interfacing the terrestrial optical network to a submarine cable of a nearby submarine optical network.

In response to the determination at block 440, the first terminal, at block 450, may initiate a submarine cable use case. Initiating the submarine cable use case may involve setting or changing one or more configurations of the first terminal in order to accommodate communication between the first terminal and the nearby submarine optical network through the OCI.

In some examples, initiating the submarine cable use case may involve initiating a power reduction program 452. The power reduction program may maintain power levels of transmissions to the OCI and submarine cable at or below a predetermined power level. The predetermined power level may be determined according to specifications and guidelines for submarine cables, such as safety guidelines. In the case of telecommunications, optical networks generally adhere to the safety guidelines for Class 1M lasers. In situations where a power level of the communication signal is above the predetermined power level, the power reduction program may cause a power level of the communication signal to be reduced.

In some examples, initiating the submarine cable use case may involve updating a travel distance between the first terminal and the OCI 454. Typically, supervisory signals transmitted between nodes of the terrestrial network travel between a transmitting node and a different receiving node, and the travel distance between the transmitting node and the receiving node can be derived from the elapsed time that the signal travels. However, in the case of a supervisory signal transmitted to an OCI and then looped back to the transmitting node, the travel distance of the signal is actually double the distance between the transmitting node and the OCI. Therefore, in order to correctly derive travel times between a transmitting node and an OCI, a distance between the transmitting node and OCI may be halved. Determining to halve the distance may be accomplished through a configuration at the first terminal, whereby when the configuration is active, a travel time of the supervisory signals transmitted from the first terminal to the OCI may be evaluated based on have the halved travel distance.

In some examples, initiating the submarine cable use case may involve updating an actual loss or attenuation of the supervisory signal between the first terminal and the OCI 456. Typically, for supervisory signals transmitted between nodes of the terrestrial network, an amount of signal loss experience between the transmitting node and the receiving node can be detected by determining a property the signal, such as the signal's power level, at each of the transmitting node and the receiving node. However, in the case of a supervisory signal transmitted to an OCI and then looped back to the transmitting node, since the signal travels double the distance, it is likely to experience double the losses during transmission. Therefore, in order to correctly derive actual losses experienced by the supervisory signals between a transmitting node and an OCI, the measured losses at the transmitting node may be halved. Determining to halve the measured losses may be accomplished through a configuration at the first terminal, whereby when the configuration is active, the measured losses are halved in order to derive an estimate of the actual losses experienced in a single trip from the first terminal to the OCI.

Figure 4:
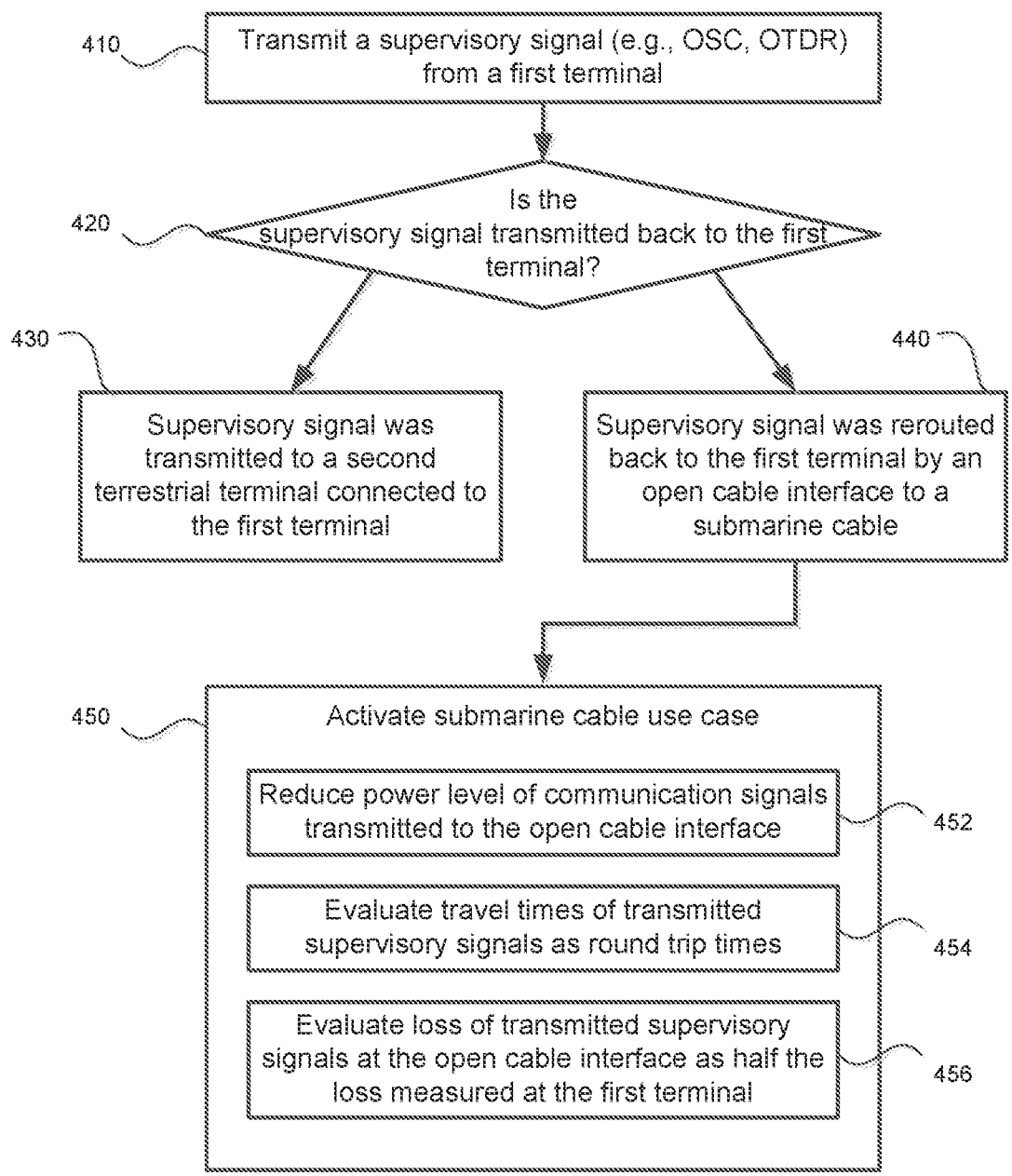
FIG. 4 is a flow diagram of an example routine according to aspects of the disclosure.

The operations of the example routines 400 of FIG. 4 may be conducted during an installation of the OCI. In other words, the first terminal may initially determine, at a time of installation of the OCI or of the first terminal, the presence of the OCI, and may initialize its settings to correctly and monitor the OCI, to transmit communication signals to the OCI in adherence with submarine cable guidelines, or a combination thereof. After this initialization, operations may continue based on the initialized configurations. In some instances, the first terminal may be capable of regularly or continuously monitoring the looping back of supervisory signals, meaning that if the signals are not looped back or if an acknowledgement is signal is received at a future time, the first terminal may determine to update its settings based on the detected presence of a second terrestrial terminal in place of the OCI.

Since the configuration operations are carried out from a terrestrial terminal that is remote from the OCI, and are not carried out at the OCI itself, it should be recognized that the installation of the terrestrial terminal may be performed by an ordinary technician, even though the terminal is being installed adjacent to an OCI interfacing a submarine optical network. By comparison, when SLTE is required to be installed adjacent to an OCI to interface terrestrial and submarine optical networks, a technician specially trained for installing SLTE is required.

As a result, terrestrial and submarine optical networks can be interfaced with one another with standard "terrestrial-grade" terrestrial terminal equipment and without requiring specialized or dedicated terminal equipment and furthermore the installation of the standard terrestrial terminal equipment can be performed by ordinary "terrestrial-grade" service technicians. This avoids the expensive costs typically associated with both specialized SLTE hardware and with installation by "white-glove" specialty technicians.

Additionally, the use of standard terrestrial terminal equipment in place of SLTE means that all terminals included in the optical network have the same terminal equipment. This allows for a single SKU to be used to track all terminal equipment, which in turn saves considerable time and hassle, as well as expenses, for those responsible for tracking and maintaining the optical network hardware.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

Most of the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. As an example, the preceding operations do not have to be performed in the precise order described above. Rather, various steps can be handled in a different order, such as reversed, or simultaneously. Steps can also be omitted unless otherwise stated. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. An open cable interface comprising:
   a first optical path configured to connect to a terrestrial cable of an optical network to a submarine cable, wherein the first optical path is configured to provide first communication signals from the optical network to the submarine cable; and
   a second optical path configured to connect the submarine cable to the terrestrial cable of the optical network, wherein the second optical path is configured to provide second communication signals from the submarine cable to the optical network, wherein the first and second communication signals are within a first frequency band; and
   a first filter positioned on the first optical path and configured to:
      pass the first communication signals; and
      filter out secondary signals from the terrestrial cable such that the secondary signals are prevented from reaching the submarine cable, wherein the secondary signals are within a second frequency band that does not overlap with the first frequency band.

2. The open cable interface of claim 1, wherein the second frequency band includes at least one of 1510 nm or 1610 nm.

3. The open cable interface of claim 1, wherein the first filter is a wavelength division multiplexing filter.

4. The open cable interface of claim 1, wherein the secondary signals include an optical supervisory channel signal.

5. The open cable interface of claim 1, wherein the secondary signals include an optical time-domain reflectometry signal.

6. The open cable interface of claim 1, further comprising a second filter positioned on the second optical path and configured to pass the second communication signals from the submarine cable to the terrestrial cable, wherein the first and second filters are configured to loop the secondary signals received from the terrestrial cable back to the terrestrial cable.

7. The open cable interface of claim 1, further comprising a first variable optical attenuator positioned on the first optical path between the first filter and the submarine cable and configured to adjust a power level of the first communication signals without affecting a power level of the secondary signals.

8. The open cable interface of claim 1, further comprising a second variable optical attenuator positioned on the second optical path between the second filter and the submarine cable.

9. The open cable interface of claim 1, wherein the open cable interface is configured to connect to a terrestrial terminal having a same stock keeping unit as other terrestrial terminals included in the optical network that do not interface submarine cables.

10. The optical network of claim 9, wherein the terrestrial cable has a same stock keeping unit as other terrestrial cables included in the optical network.

* * * * *